US010020911B2

(12) United States Patent
Mallik et al.

(10) Patent No.: US 10,020,911 B2
(45) Date of Patent: Jul. 10, 2018

(54) METHOD AND APPARATUS FOR IMPROVING RESOURCE USAGE IN COMMUNICATION NETWORKS USING INTERFERENCE CANCELATION

(71) Applicant: QUALCOMM Incorporated, San Diego, CA (US)

(72) Inventors: Siddhartha Mallik, San Diego, CA (US); Tao Luo, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/984,127

(22) Filed: Dec. 30, 2015

(65) Prior Publication Data
US 2016/0112154 A1  Apr. 21, 2016

Related U.S. Application Data

(62) Division of application No. 13/863,927, filed on Apr. 16, 2013, now Pat. No. 9,270,441.
(Continued)

(51) Int. Cl.
*H04W 16/02* (2009.01)
*H04W 72/04* (2009.01)
(Continued)

(52) U.S. Cl.
CPC .......... *H04L 1/0003* (2013.01); *H04L 5/0073* (2013.01); *H04W 72/0426* (2013.01);
(Continued)

(58) Field of Classification Search
None
See application file for complete search history.

(56) References Cited

U.S. PATENT DOCUMENTS

2011/0081933 A1* 4/2011 Suh ................ G01S 5/0236
455/509
2011/0319025 A1  12/2011 Siomina et al.
(Continued)

FOREIGN PATENT DOCUMENTS

CN  102469487 A  5/2012
CN  102655681 A  9/2012
(Continued)

OTHER PUBLICATIONS

3GPP TSG-RAN WG1: "Further Considerations on Scenario3", Hitachi Ltd, 3GPP Draft; R1-113064 Further Considerations on Scenario3 Hitachi, 3rd Generation Partnership Project (3GPP), Mobile Competence Centre; 650, Route Des Lucioles; F-06921 Sophia-Antipolis Cedex; France, vol. RAN WG1, No. Zhuhai; Oct. 10, 2011, Oct. 3, 2011 (Oct. 3, 2011), pp. 1-6, XP050538090, [retrieved on Oct. 3, 2011] Section 2.1.
(Continued)

*Primary Examiner* — Duc T Duong
(74) *Attorney, Agent, or Firm* — Norton Rose Fulbright LLP

(57) ABSTRACT

Systems, method and devices utilized in wireless communication may include creating, scheduling and/or using a transmission having at least one quasi-ABS which includes at least one macro set corresponding to a designated sector of a plurality of sectors in a macro node. Such subframes may be formed and partitioned to provide for a partition which may be used by a range expansion resource, such as a pico node or user entity.

21 Claims, 9 Drawing Sheets

Related U.S. Application Data

(60) Provisional application No. 61/718,127, filed on Oct. 24, 2012.

(51) Int. Cl.
*H04W 72/12* (2009.01)
*H04W 84/04* (2009.01)
*H04L 1/00* (2006.01)
*H04L 5/00* (2006.01)
*H04W 72/08* (2009.01)

(52) U.S. Cl.
CPC ......... *H04W 72/082* (2013.01); *H04W 72/12* (2013.01); *H04W 72/042* (2013.01); *H04W 72/048* (2013.01); *H04W 72/0446* (2013.01); *H04W 72/1278* (2013.01); *H04W 84/045* (2013.01)

(56) References Cited

U.S. PATENT DOCUMENTS

| | | |
|---|---|---|
| 2012/0083280 A1 | 4/2012 | Liu et al. |
| 2012/0113812 A1 | 5/2012 | Ji et al. |
| 2012/0120846 A1* | 5/2012 | Hwang ................ H04W 24/10 370/254 |
| 2012/0149362 A1* | 6/2012 | Tooher ................ H04W 24/10 455/423 |
| 2012/0243488 A1 | 9/2012 | Gupta et al. |
| 2012/0263247 A1 | 10/2012 | Bhattad et al. |
| 2013/0016692 A1 | 1/2013 | Chen et al. |
| 2013/0170376 A1 | 7/2013 | Dinan |
| 2013/0194950 A1 | 8/2013 | Haghighat et al. |
| 2013/0229933 A1* | 9/2013 | Ji ........................ H04L 1/0027 370/252 |
| 2013/0252626 A1 | 9/2013 | Lee et al. |
| 2013/0322235 A1 | 12/2013 | Khoryaev et al. |
| 2013/0336274 A1* | 12/2013 | Simonsson ........... H04W 16/32 370/329 |
| 2014/0071957 A1* | 3/2014 | Xu .................... H04W 52/0219 370/336 |
| 2014/0112262 A1 | 4/2014 | Mallik |
| 2014/0198744 A1* | 7/2014 | Wang .................. H04B 7/0617 370/329 |
| 2014/0198774 A1 | 7/2014 | Hwang et al. |
| 2015/0031369 A1* | 1/2015 | Gunnarsson ......... H04W 36/04 455/438 |
| 2015/0043369 A1* | 2/2015 | Kim ...................... H04J 11/005 370/252 |
| 2015/0131599 A1 | 5/2015 | Xue et al. |
| 2015/0207596 A1* | 7/2015 | Kroener ............... H04W 16/08 370/329 |
| 2015/0207601 A1 | 7/2015 | Kim et al. |
| 2015/0208423 A1* | 7/2015 | Manssour ............ H04W 28/16 370/329 |
| 2015/0237517 A1 | 8/2015 | Hwang et al. |
| 2016/0029321 A1* | 1/2016 | Hwang ................. H04J 11/005 455/450 |
| 2017/0317775 A1* | 11/2017 | Hwang ................. H04J 11/005 |

FOREIGN PATENT DOCUMENTS

| | | |
|---|---|---|
| WO | WO-2012046997 A1 | 4/2012 |
| WO | WO-2012079757 A1 | 6/2012 |

OTHER PUBLICATIONS

Barbieri A., et al., "Coordinated downlink multi-point communications in heterogeneous cellular networks", Information Theory and Applications Workshop (ITA), 2012, IEEE, Feb. 5, 2012 (Feb. 5, 2012), pp. 7-16, XP032162910, DOI: 10.1109/ITA.2012.6181826 ISBN: 978-1-4673-1473-2 Sections I, III and V.

International Search Report and Written Opinion—PCT/US2013/065191—ISA/EPO—Jun. 30, 2014.

ZTE: "On Signalling Support for Reduced Power ABS", 3GPP TSG-RAN WG1#70 R1-123665, Aug. 5, 2012, pp. 1-4, URL: http://www.3gpp.org/ftp/tsg_ran/WG1_RL1/TSGR1_70/Docs/R1-123665.zip.

* cited by examiner

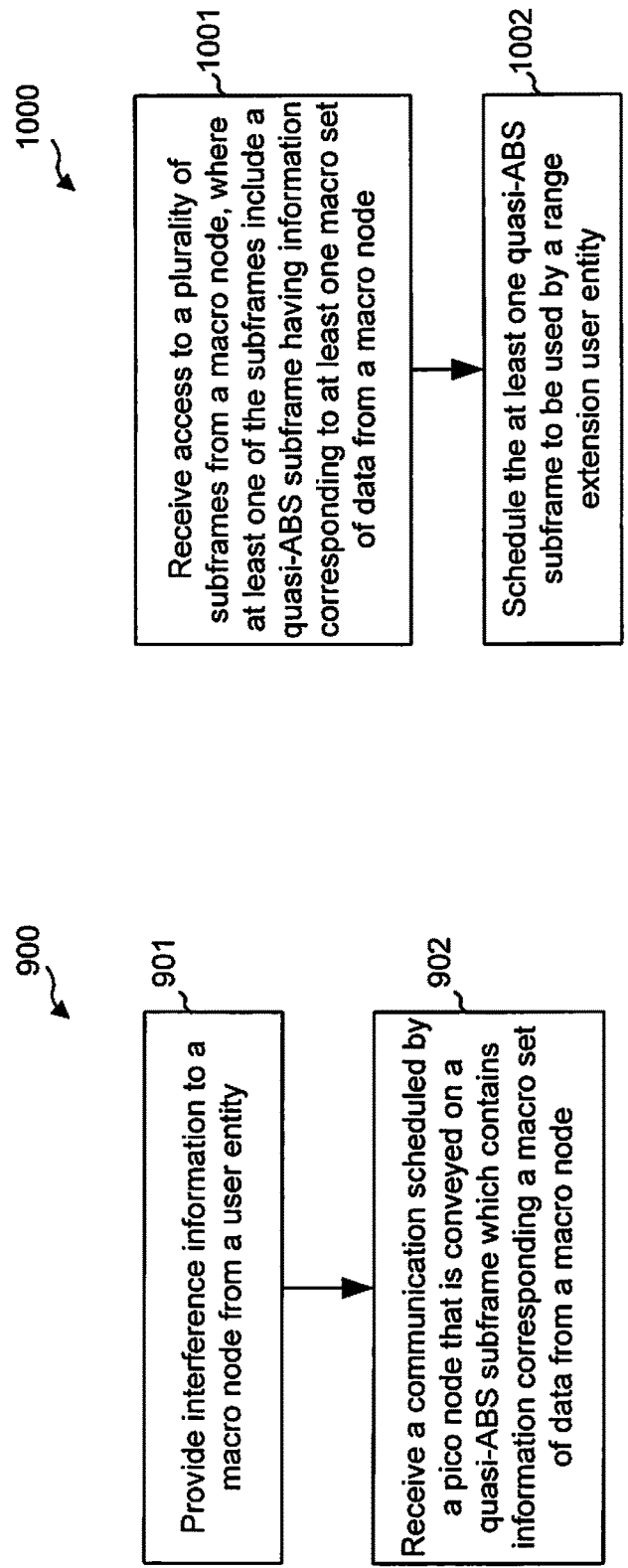

METHOD AND APPARATUS FOR IMPROVING RESOURCE USAGE IN COMMUNICATION NETWORKS USING INTERFERENCE CANCELATION

CROSS-REFERENCE TO RELATED APPLICATIONS

This application is a divisional of co-pending U.S. patent application Ser. No. 13/863,927, entitled METHOD AND APPARATUS FOR IMPROVING RESOURCE USAGE IN COMMUNICATION NETWORKS USING INTERFERENCE CANCELLATION, filed Apr. 16, 2013, which claims priority to U.S. Provisional Patent Application No. 61/718,127, entitled, "METHOD AND APPARATUS FOR IMPROVING RESOURCE USAGE IN COMMUNICATION NETWORKS USING INTERFERENCE CANCELLATION", filed on Oct. 24, 2012, which is expressly incorporated by reference herein in its entirety.

BACKGROUND

Field

Aspects of the present disclosure relate generally to wireless communication systems, and more particularly, to improving resource usage in communication networks using interference cancellation.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

Some wireless network use a diverse set of base stations, such as higher powered macro cells, and lower powered pico nodes, femto nodes, and relays, to improve the spectral efficiency of the system per unit area. Because these wireless networks use such different base stations and nodes for their spectral coverage, they are often referred to as heterogeneous networks. The higher-powered macro cells are able to offload service of UEs to the lower-powered nodes in order to increase the service capacity and quality. Because the higher power signals from the macro cells may cause interference with the lower power signals from the pico or femto nodes, resource partitioning mechanisms are used to reduce the potential interference. Increased load handling efficiency may be realized by providing service schemes at the edges of the coverage areas of the lower-powered nodes. Within these areas, referred to as the cell range expansion, resource partitioning methods between macro and pico/femto nodes are utilized. However, such partitioning schemas give rise to inefficiencies. For example, when a network is adjusted for greater pico cell range expansion, macro nodes are configured to relinquish resources. Conversely, if no partitioning is implemented, UEs in the pico cell range expansion region will be in outage. To prevent such outage, these UEs connect to the macro node, which results in a disproportionate number of UEs connecting to a macro node instead of a pico/femto node due to the higher power signal of the macro node. These cases each hinder throughput capabilities because of a lack of balance of resources, e.g. when excessive UEs are connected to a pico/femto node, the pico/femto node is forced to maintain the burden for scheduling for each of the UEs. Conversely, when UEs are more directed toward the macro node, the distributed capabilities of the pico/femto nodes are underutilized.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes forming a plurality of macro sets according to operating characteristics of a macro node, forming at least one quasi-ABS including at least one active macro set of the plurality of macro sets, and partitioning a plurality of subframes to provide for a partition which will be used by a range expansion resource, wherein at least one subframe of the partitioned plurality of subframes includes at least one of the formed quasi-ABSs.

In an additional aspect of the disclosure, an apparatus configured for wireless communication includes a means for a plurality of macro sets according to operating characteristics of a macro node, means for forming at least one quasi-ABS including at least one active macro set of the plurality of macro sets, and means for partitioning a plurality of subframes to provide for a partition which will be used by a range expansion resource, wherein at least one subframe of the partitioned plurality of subframes includes at least one of the formed quasi-ABSs.

In an additional aspect of the disclosure, a computer program product, includes a non-transitory computer-readable medium. The non-transitory computer readable medium includes code for causing a computer to form a plurality of macro sets according to operating characteristics of a macro node, form at least one quasi-ABS including at least one active macro set of the plurality of macro sets, and partition a plurality of subframes to provide for a partition which will be used by a range expansion resource, wherein at least one subframe of the partitioned plurality of subframes includes at least one of the formed quasi-ABSs.

In an additional aspect of the disclosure, an apparatus includes at least one processor configured to: form a plurality of macro sets according to operating characteristics of a macro node, to form at least one quasi-ABS including at least one active macro set of the plurality of macro sets, and to partition a plurality of subframes to provide for a partition which will be used by a range expansion resource, wherein at least one subframe of the partitioned plurality of subframes includes at least one of the formed quasi-ABSs.

In one aspect of the disclosure, a method of wireless communication includes providing, by a user entity, interference information to a macro node, and receiving a communication scheduled by a pico node, wherein the communication is conveyed on a quasi-ABS which includes information corresponding to at least one macro set of data from a macro node.

In an additional aspect of the disclosure, an apparatus configured for wireless communication includes a means for providing, by a user entity, interference information to a macro node, and means for receiving a communication scheduled by a pico node, wherein the communication is conveyed on a quasi-ABS which includes information corresponding to at least one macro set of data from a macro node.

In an additional aspect of the disclosure, a computer program product, includes a non-transitory computer-readable medium. The non-transitory computer readable medium includes code for causing a computer to provide, by a user entity, interference information to a macro node, and to receive a communication scheduled by a pico node, wherein the communication is conveyed on a quasi-ABS which includes information corresponding to at least one macro set of data from a macro node.

In an additional aspect of the disclosure, an apparatus includes at least one processor configured to: to provide, by a user entity, interference information to a macro node, and to receive a communication scheduled by a pico node, wherein the communication is conveyed on a quasi-ABS which includes information corresponding to at least one macro set of data from a macro node.

In one aspect of the disclosure, a method of wireless communication includes receiving access to a plurality of subframes from a macro node, wherein at least one of the plurality of subframes includes a quasi-ABS which includes information corresponding to at least one macro set of data from a macro node, and scheduling the at least one quasi-ABS to be used by a range expansion user entity.

In an additional aspect of the disclosure, an apparatus configured for wireless communication includes a means for receiving access to a plurality of subframes from a macro node, wherein at least one of the plurality of subframes includes a quasi-ABS which includes information corresponding to at least one macro set of data from a macro node, and means for scheduling the at least one quasi-ABS to be used by a range expansion user entity.

In an additional aspect of the disclosure, a computer program product, includes a non-transitory computer-readable medium. The non-transitory computer readable medium includes code for causing a computer to receive access to a plurality of subframes from a macro node, wherein at least one of the plurality of subframes includes a quasi-ABS which includes information corresponding to at least one macro set of data from a macro node, and schedule the at least one quasi-ABS to be used by a range expansion user entity.

In an additional aspect of the disclosure, an apparatus includes at least one processor configured to: to receive access to a plurality of subframes from a macro node, wherein at least one of the plurality of subframes includes a quasi-ABS which includes information corresponding to at least one macro set of data from a macro node, and to schedule the at least one quasi-ABS to be used by a range expansion user entity.

BRIEF DESCRIPTION OF THE DRAWINGS

FIG. 9 is a functional block diagram illustrating example blocks executed to implement one aspect of the present disclosure.

FIG. 10 is a functional block diagram illustrating example blocks executed to implement one aspect of the present disclosure.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
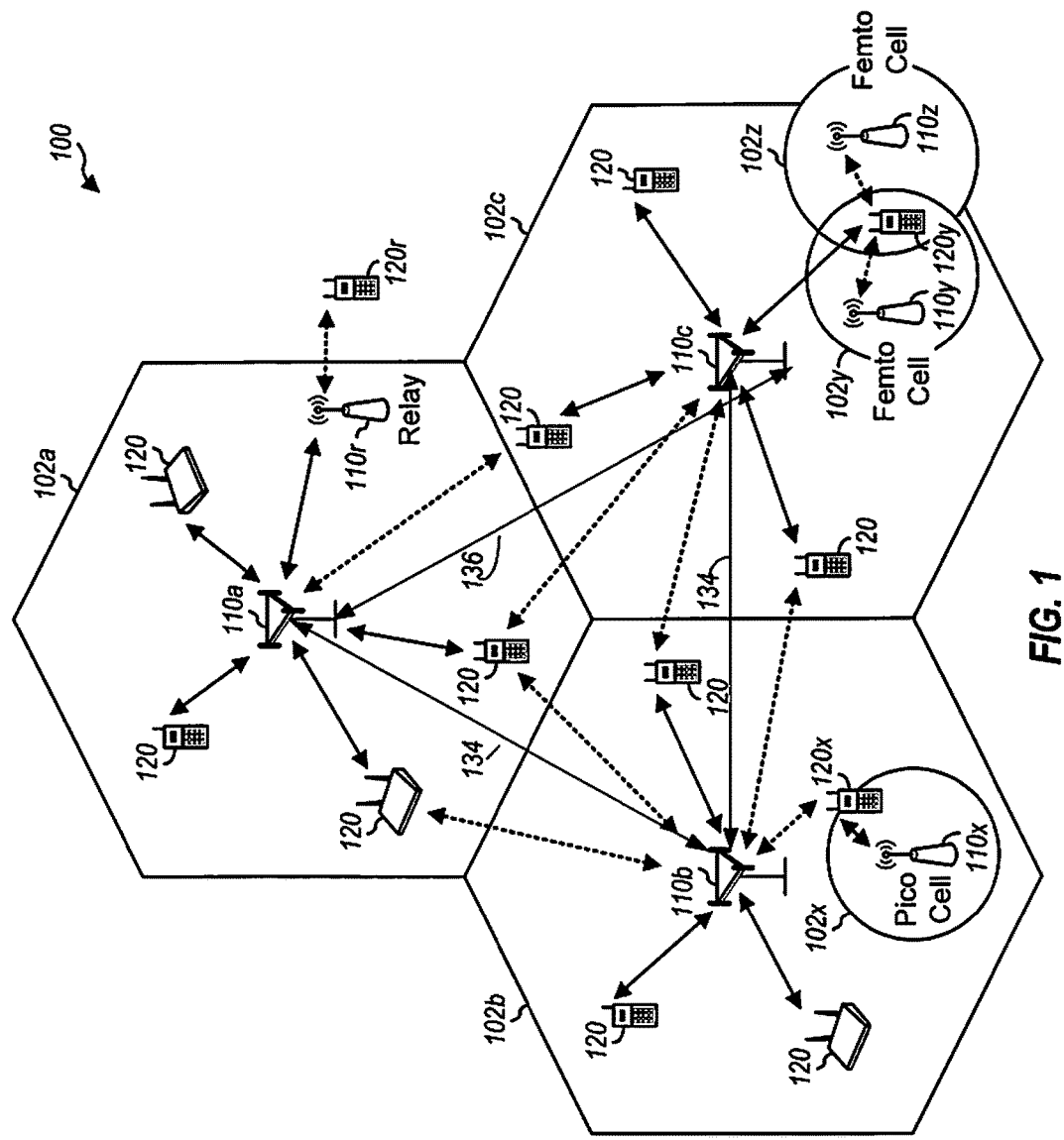
FIG. 1 is a block diagram conceptually illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
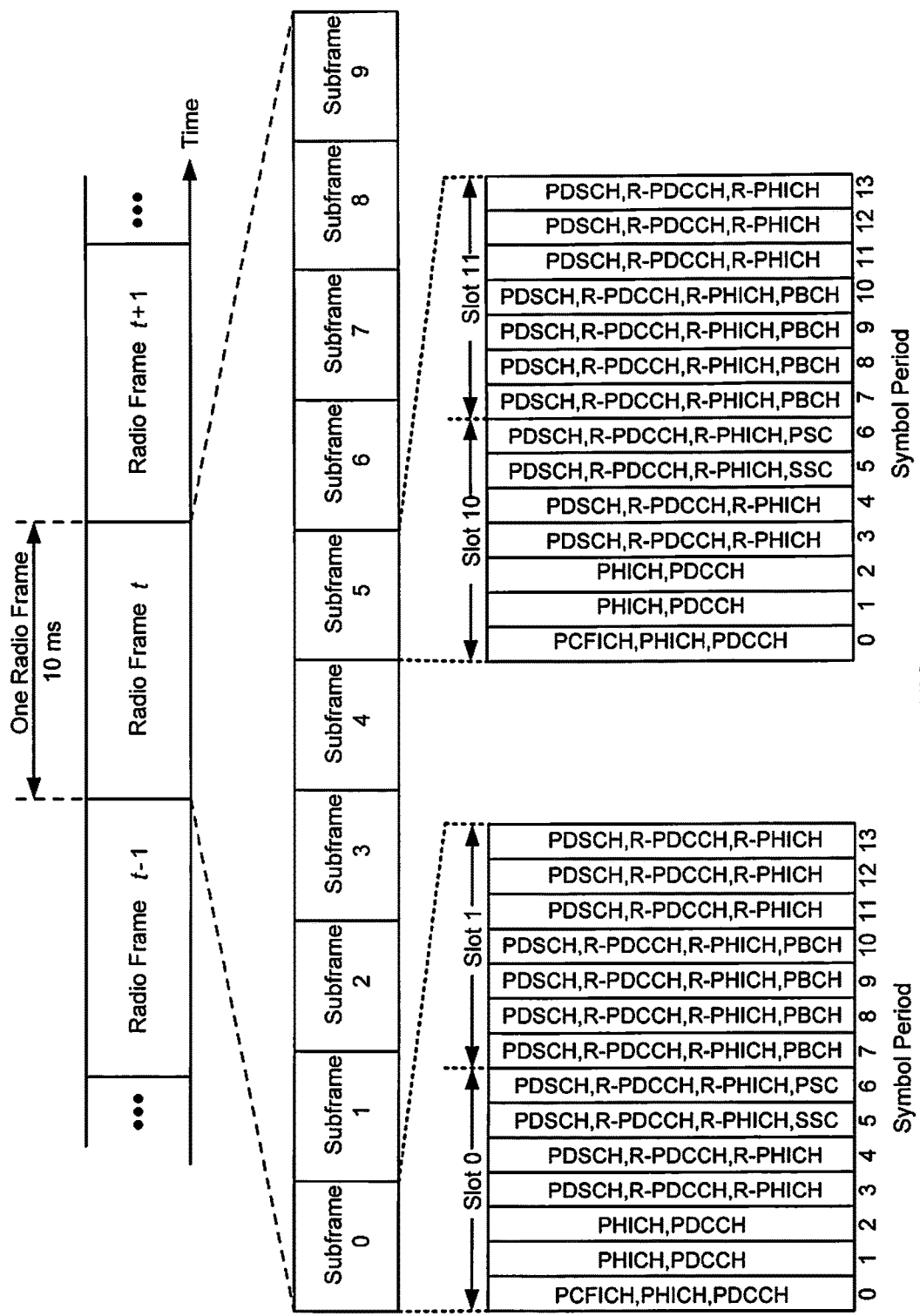
FIG. 2 is a block diagram conceptually illustrating an example of a downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE/-A, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to sending PHICH and PDCCH in the control section of each subframe, i.e., the first symbol period of each subframe, the LTE-A may also transmit these control-oriented channels in the data portions of each subframe as well. As shown in FIG. 2, these new control designs utilizing the data region, e.g., the Relay-Physical Downlink Control Channel (R-PDCCH) and Relay-Physical HARQ Indicator Channel (R-PHICH) are included in the later symbol periods of each subframe. The R-PDCCH is a new type of control channel utilizing the data region originally developed in the context of half-duplex relay operation. Different from legacy PDCCH and PHICH, which occupy the first several control symbols in one subframe, R-PDCCH and R-PHICH are mapped to resource elements (REs) originally designated as the data region. The new control channel may be in the form of Frequency Division Multiplexing (FDM), Time Division Multiplexing (TDM), or a combination of FDM and TDM.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
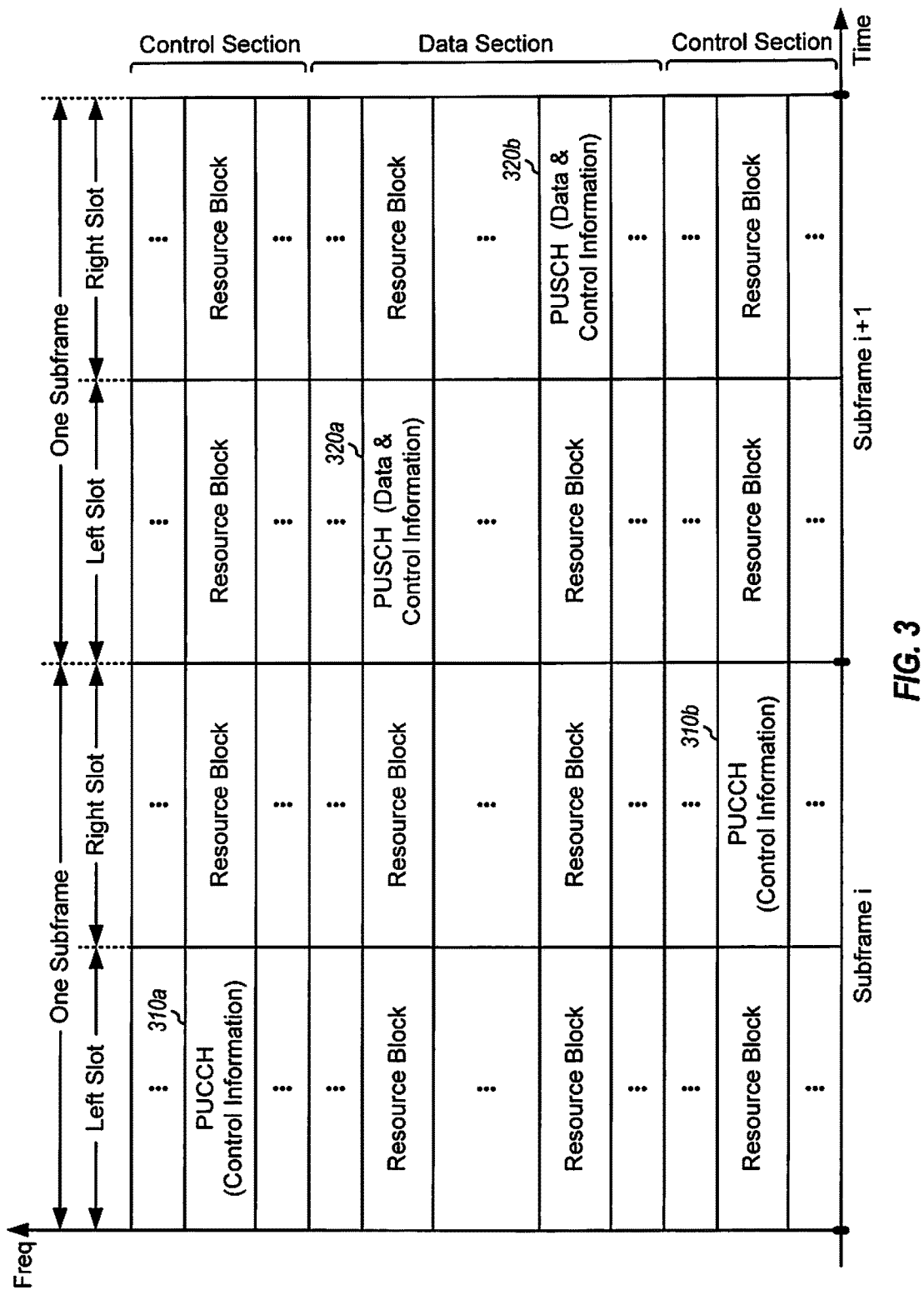
FIG. 3 is a block diagram conceptually illustrating an exemplary frame structure in uplink LTE/-A communications.

FIG. 3 is a block diagram illustrating an exemplary frame structure 300 in uplink long term evolution (LTE/-A) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNode B. The UE may transmit control information in a Physical Uplink Control Channel (PUCCH) on the assigned resource blocks 310a and 310b in the control section. The UE may transmit only data or both data and control information in a Physical Uplink Shared Channel (PUSCH) on the assigned resource blocks 320a and 320b in the data section. An uplink transmission may span both slots of a subframe and may hop across frequency as shown in FIG. 3.

Referring back to FIG. 1, the wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x and the relay station 110r, which generally transmit at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110y-z typically also transmit at substantially lower power levels (e.g., 100 mW-2 W) than the macro eNBs 110a-c.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110x, is characterized by a substantially lower transmit power when compared with a macro eNB, such as the macro eNBs 110a-c. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110a-c and the pico eNB 110x implies that, in a mixed deployment, the downlink coverage area of the pico eNB 110x will be much smaller than that of the macro eNBs 110a-c.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

If server selection is based predominantly on downlink received signal strength, the usefulness of mixed eNB deployment of heterogeneous networks, such as the wireless network 100, will be greatly diminished. This is because the larger coverage area of the higher powered macro eNBs, such as the macro eNBs 110a-c, limits the benefits of splitting the cell coverage with the pico eNBs, such as the pico eNB 110x, because, the higher downlink received signal strength of the macro eNBs 110a-c will attract all of the available UEs, while the pico eNB 110x may not be serving any UE because of its much weaker downlink transmission power. Moreover, the macro eNBs 110a-c will likely not have sufficient resources to efficiently serve those UEs. Therefore, the wireless network 100 will attempt to actively balance the load between the macro eNBs 110a-c and the pico eNB 110x by expanding the coverage area of the pico eNB 110x. This concept is referred to as cell range expansion (CRE).

The wireless network 100 achieves CRE by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources between the macro eNBs 110a-c and the pico eNB 110x. However, even with this active balancing of load, downlink interference from the macro eNBs 110a-c should be mitigated for the UEs served by the pico eNBs, such as the pico eNB 110x. This can be accomplished by various methods, including interference cancellation at the UE, resource coordination among the eNBs 110, or the like.

In a heterogeneous network with cell range expansion, such as the wireless network 100, in order for UEs to obtain service from the lower-powered eNBs, such as the pico eNB 110x, in the presence of the stronger downlink signals transmitted from the higher-powered eNBs, such as the macro eNBs 110a-c, the pico eNB 110x engages in control channel and data channel interference coordination with the dominant interfering ones of the macro eNBs 110a-c. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNB for use exclusively by the first eNB. Protected subframes may also be referred to as "clean" subframes based on the lack of interference from neighboring eNBs. Prohibited subframes are subframes assigned to a neighbor eNB, and the first eNB is prohibited from transmitting data during the prohibited subframes. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

At least one protected subframe is statically assigned per period. In some cases only one protected subframe is statically assigned. For example, if a period is 8 milliseconds, one protected subframe may be statically assigned to an eNB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

Figure 4:
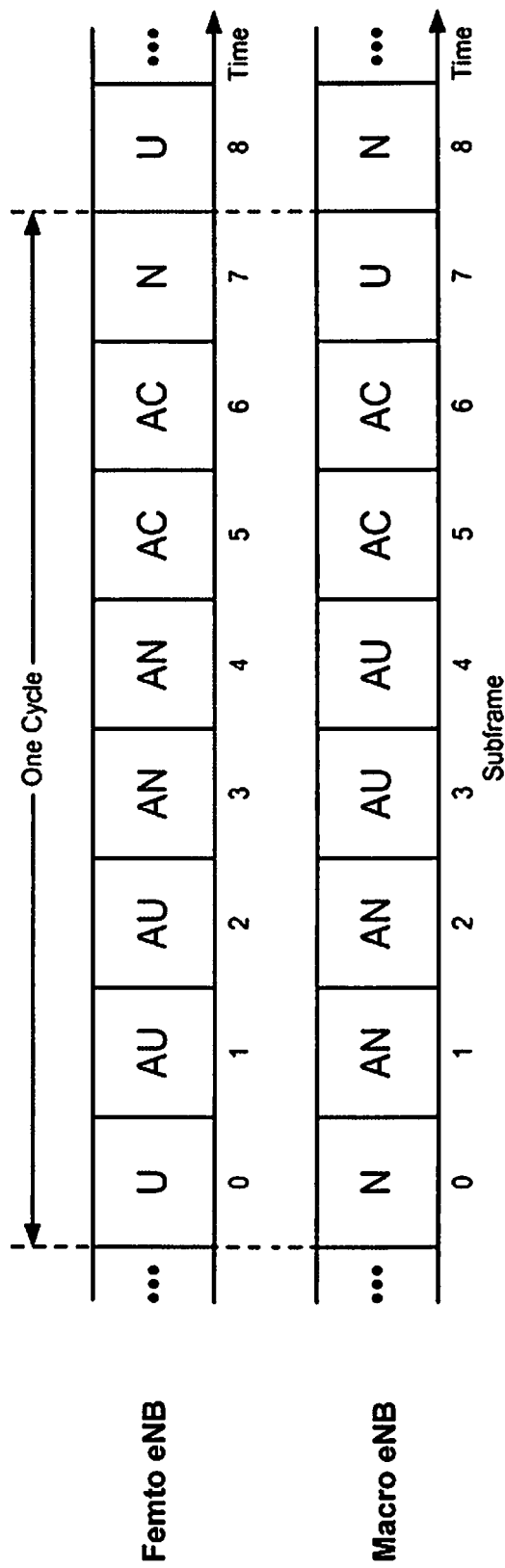
FIG. 4 is a block diagram conceptually illustrating time division multiplexed (TDM) partitioning in a heterogeneous network according to one aspect of the disclosure.

FIG. 4 is a block diagram illustrating time division multiplexed (TDM) partitioning in a heterogeneous network according to one aspect of the disclosure. A first row of blocks illustrate subframe assignments for a femto eNB, and a second row of blocks illustrate subframe assignments for a macro eNB. Each of the eNBs has a static protected subframe during which the other eNB has a static prohibited subframe. For example, the femto eNB has a protected subframe (U subframe) in subframe 0 corresponding to a prohibited subframe (N subframe) in subframe 0. Likewise, the macro eNB has a protected subframe (U subframe) in subframe 7 corresponding to a prohibited subframe (N subframe) in subframe 7. Subframes 1-6 are dynamically assigned as either protected subframes (AU), prohibited subframes (AN), and common subframes (AC). During the dynamically assigned common subframes (AC) in subframes 5 and 6, both the femto eNB and the macro eNB may transmit data.

Protected subframes (such as U/AU subframes) have reduced interference and a high channel quality because aggressor eNBs are prohibited from transmitting. Prohibited subframes (such as N/AN subframes) have no data transmission to allow victim eNBs to transmit data with low interference levels. Common subframes (such as C/AC subframes) have a channel quality dependent on the number of neighbor eNBs transmitting data. For example, if neighbor eNBs are transmitting data on the common subframes, the channel quality of the common subframes may be lower than the protected subframes. Channel quality on common subframes may also be lower for extended boundary area (EBA) UEs strongly affected by aggressor eNBs. An EBA UE may belong to a first eNB but also be located in the coverage area of a second eNB. For example, a UE communicating with a macro eNB that is near the range limit of a femto eNB coverage is an EBA UE.

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNBs and UEs over all of the time or frequency resources that maximizes the total utility of the network. "Utility" may be defined as a function of user data rates, delays of quality of service (QoS) flows, and fairness metrics. Such an algorithm can be computed by a central entity that has access to all of the information used for solving the optimization and has control over all of the transmitting entities. This central entity may not always be practical or even desirable. Therefore, in alternative aspects a distributed algorithm may be used that makes resource usage decisions based on the channel information from a certain set of nodes. Thus, the slowly-adaptive interference algorithm may be deployed either using a central entity or by distributing the algorithm over various sets of nodes/entities in the network.

In deployments of heterogeneous networks, such as the wireless network 100, a UE may operate in a dominant interference scenario in which the UE may observe high interference from one or more interfering eNBs. A dominant interference scenario may occur due to restricted association. For example, in FIG. 1, the UE 120y may be close to the femto eNB 110y and may have high received power for the eNB 110y. However, the UE 120y may not be able to access the femto eNB 110y due to restricted association and may then connect to the macro eNB 110c (as shown in FIG. 1) or to the femto eNB 110z also with lower received power (not shown in FIG. 1). The UE 120y may then observe high interference from the femto eNB 110y on the downlink and may also cause high interference to the eNB 110y on the uplink. Using coordinated interference management, the eNB 110c and the femto eNB 110y may communicate over the backhaul 134 to negotiate resources. In the negotiation, the femto eNB 110y agrees to cease transmission on one of its channel resources, such that the UE 120y will not experience as much interference from the femto eNB 110y as it communicates with the eNB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNBs. The eNBs in a synchronous system are presumptively synchronized across the system. However, for example, considering a UE that is a distance of 5 km from the macro eNB, the propagation delay of any downlink signals received from that macro eNB would be delayed approximately 16.67 μS (5 km÷3×10$^8$, i.e., the speed of light, 'c'). Comparing that downlink signal from the macro eNB to the downlink signal from a much closer femto eNB, the timing difference could approach the level of a time-to-live (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Figure 5:
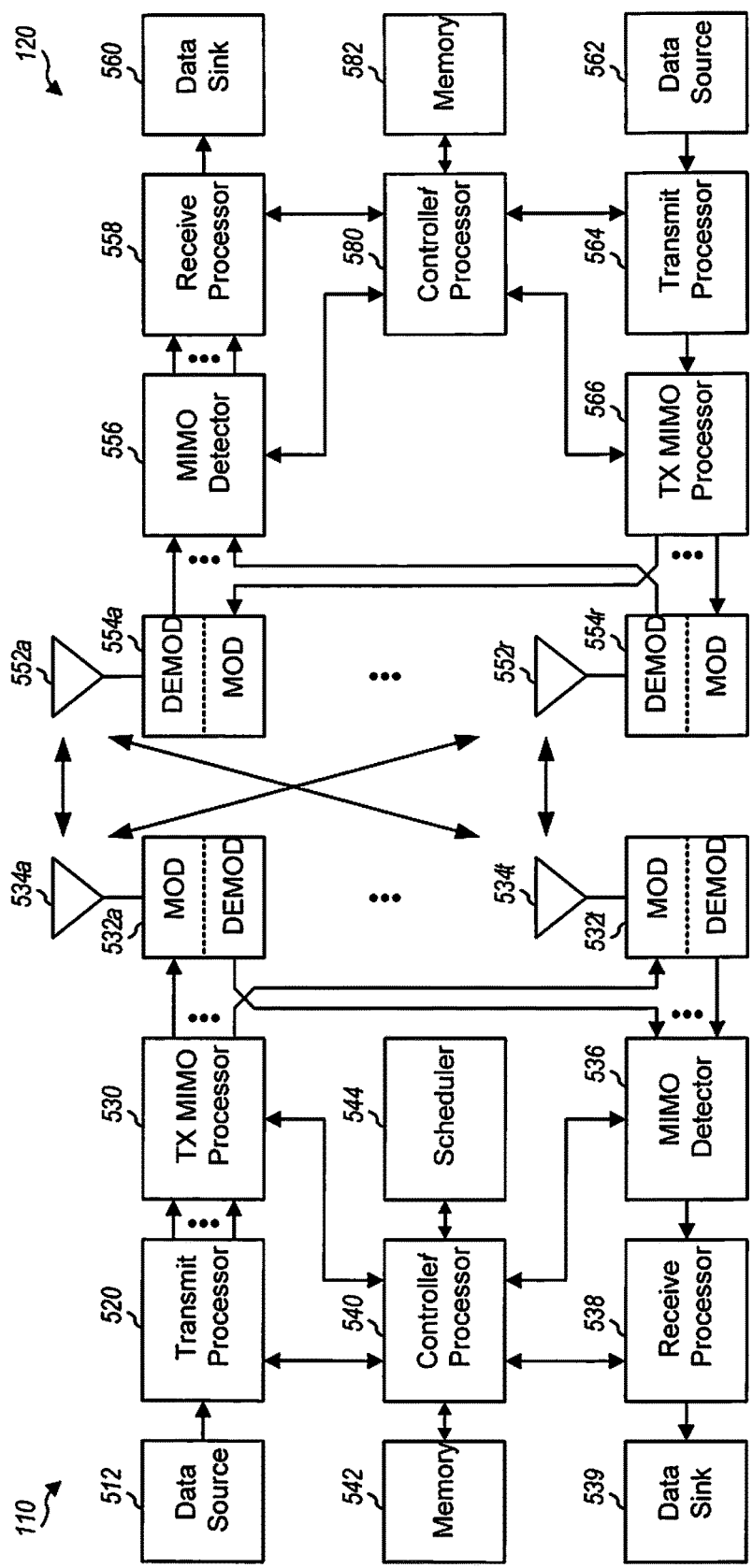
FIG. 5 is a block diagram conceptually illustrating a design of a base station/eNB and a UE configured according to one aspect of the present disclosure.

FIG. 5 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type, such as a pico eNB 110x. The eNB 110 may be equipped with antennas 534a through 534t, and the UE 120 may be equipped with antennas 552a through 552r.

At the eNB 110, a transmit processor 520 may receive data from a data source 512 and control information from a controller/processor 540. The control information may be for the PBCH, PCFICH, PHICH, PDCCH, etc. The data may be for the PDSCH, etc. The transmit processor 520 may process (e.g., encode and symbol map) the data and control information to obtain data symbols and control symbols, respectively. The transmit processor 520 may also generate reference symbols, e.g., for the PSS, SSS, and cell-specific reference signal. A transmit (TX) multiple-input multiple-output (MIMO) processor 530 may perform spatial processing (e.g., precoding) on the data symbols, the control symbols, and/or the reference symbols, if applicable, and may provide output symbol streams to the modulators (MODs) 532a through 532t. Each modulator 532 may process a respective output symbol stream (e.g., for OFDM, etc.) to obtain an output sample stream. Each modulator 532 may further process (e.g., convert to analog, amplify, filter, and upconvert) the output sample stream to obtain a downlink signal. Downlink signals from modulators 532a through 532t may be transmitted via the antennas 534a through 534t, respectively.

At the UE 120, the antennas 552a through 552r may receive the downlink signals from the eNB 110 and may provide received signals to the demodulators (DEMODs)

554a through 554r, respectively. Each demodulator 554 may condition (e.g., filter, amplify, downconvert, and digitize) a respective received signal to obtain input samples. Each demodulator 554 may further process the input samples (e.g., for OFDM, etc.) to obtain received symbols. A MIMO detector 556 may obtain received symbols from all the demodulators 554a through 554r, perform MIMO detection on the received symbols if applicable, and provide detected symbols. A receive processor 558 may process (e.g., demodulate, deinterleave, and decode) the detected symbols, provide decoded data for the UE 120 to a data sink 560, and provide decoded control information to a controller/processor 580.

On the uplink, at the UE 120, a transmit processor 564 may receive and process data (e.g., for the PUSCH) from a data source 562 and control information (e.g., for the PUCCH) from the controller/processor 580. The transmit processor 564 may also generate reference symbols for a reference signal. The symbols from the transmit processor 564 may be precoded by a TX MIMO processor 566 if applicable, further processed by the demodulators 554a through 554r (e.g., for SC-FDM, etc.), and transmitted to the eNB 110. At the eNB 110, the uplink signals from the UE 120 may be received by the antennas 534, processed by the modulators 532, detected by a MIMO detector 536 if applicable, and further processed by a receive processor 538 to obtain decoded data and control information sent by the UE 120. The processor 538 may provide the decoded data to a data sink 539 and the decoded control information to the controller/processor 540.

The controllers/processors 540 and 580 may direct the operation at the eNB 110 and the UE 120, respectively. The controller/processor 540 and/or other processors and modules at the eNB 110 may perform or direct the execution of various processes for the techniques described herein. The controllers/processor 580 and/or other processors and modules at the UE 120 may also perform or direct the execution of the functional blocks illustrated in FIGS. 8 and 9, and/or other processes for the techniques described herein. The memories 542 and 582 may store data and program codes for the eNB 110 and the UE 120, respectively. A scheduler 544 may schedule UEs for data transmission on the downlink and/or uplink.

As previously noted, UEs may perform a broad variety of interference cancellation (IC) in normal operation. UEs may cancel synchronization signals, such as PSS and SSS, broadcast channel interference from PBCH, common signals, such as common reference signals (CRS), control channel interference, such as from PCFICH, PHICH, PDCCH, data channel interference, such as from PDSCH, and the like. In interference cancellation of certain high bandwidth interference, such as data interference cancellation from PDSCH, the UE may have bandwidth-dependent IC capabilities. For example, in IC of PDSCH interference, the UE may be limited to IC over a certain number of resource blocks (RBs) because of the complexity constraint of IC over a larger bandwidth of signals.

While UEs may maintain the capabilities to do most of these types of IC processing, a UE may disable some of this IC capability based on radio conditions. Moreover, if a serving eNB is aware of the UE IC capabilities, it may use this information to assist the UE in managing power consumption or to account for and/or manage the UE's IC capabilities to better schedule downlink or uplink transmission schedules.

In one aspect of the present disclosure, a UE may deactivate different IC capabilities based on the operating conditions that it is experiencing. Operating conditions may be conditions such as the radio conditions viewed by the UE, the battery power level of the UE, the power consumption rate, or the like. For example, if the battery power is very low, the UE may determine to deactivate all but a few IC capabilities or even simply deactivate all of its IC capabilities. In another example, if the radio conditions are very good without much interference, the UE may determine to deactivate data IC, control channel IC, but maintain synchronization signal IC and CRS IC.

Alternatively, the UE may select which of its IC capabilities to maintain and/or deactivate based on the detected operating conditions, the UE may adjust how it reports its currently selected IC capability to the base station.

In order to further manage UE IC capabilities, a UE may divide its IC capabilities into different groups. These groups may be simple or random groups or may also be logical groups. For example, a first capability group may include common channel IC, such as IC of PSS, SSS, PBCH, CRS, and the like (Group 1). A second capability group may include control channel IC, such as IC of PCFICH, PHICH, and PDCCH, and the like (Group 2). A third capability group may include data channel IC, such as IC of PDSCH interference (Group 3). With the UEs' IC capabilities divided into defined groups, the UE may signal its IC capabilities to eNBs based on its defined groups, such that a given UE may signal the eNB that it uses capability Groups 1, 2, and 3, or some combination of capability Groups 1, 2, and 3. Alternatively, the UE may define its capabilities based on IC classes, whereby Class 1 includes the capabilities associated with Group 1, Class 2 includes the capabilities associated with Group 1 and Group 2, etc. The number of groups and classes and their respective granularity of capabilities may also vary based on implementation.

Referring back to FIG. 1, macro cell 102b includes macro eNB 110b and pico eNB 110x. Macro cell 102b further includes multiple UEs 120, one of which is a range expansion UE 120x that is disposed within pico cell 102x. Any particular UE is referred to as a range expansion UE when it is located within the CRE area of a particular pico node. It is appreciated that UE 120x is subjected to multiple interference sources such as intra-cell interference from devices within cell 102b (e.g. eNB 110b, other UEs within cell 102b, and the like), and inter-cell interference from other devices, such as macro eNB 110c. Current UEs employ various techniques to handle interferences caused by these various sources as discussed above. For example, a UE may be configured to utilize control and data IC methods where the interference from one or more cells is estimated/decoded and then cancelled at the UE. These methods reduce the total interference seen by a UE and improve overall UE throughputs. Such IC methods may be implemented within a UE (such as UE 120 of FIG. 5) using one or more processing resources such as receive processor 558, transmit processor 564, controller processor 580, etc.

Aspects of the present application may provide for co-scheduling of data/control IC capable range expansion UEs, by pico nodes, on resources which are used by macro nodes. By utilizing such co-scheduling, efficient range expansion may be implemented while allowing a macro node to not relinquish any (or to relinquish less) resources to pico nodes. Further, aspects may provide for static or dynamic coordination among macro nodes to control the power and other characteristics of interference (e.g. data signals that can be readily cancelled) which are created by macro node transmissions to pico served UEs.

It is noted that when discussing the following example aspects the term "subframe" is used to denote a unit of resource in time. The term subframe may also be applied to any other unit of resource such as a subband (in frequency), or a combination of such unit types.

It should be further noted that, for purposes of this disclosure, pico node will be used to refer to any type of lower powered node or access point, such as a pico access point, femto access point, relay, remote radio head (RRH), and the like.

In the absence of control/data IC by a UE, a macro node usually does not transmit control/data on certain subframes. Such frames are referred to as almost blank subframes (ABS), as they may be blank, or may contain pilot signals or other reference signals. For example, in a range expansion scenario, four out of eight subframes may be marked as ABS. In this case, a macro UE is often not scheduled for fifty percent of the time (e.g., during the ABSs) and a pico range expansion UE is often not scheduled for the other fifty percent of the time.

However, if the range expansion UEs are control/data IC capable, in some aspects, the ABSs can be converted to quasi-ABSs. To do this, a plurality of macro sets are designated according to operating characteristics of a macro node. Operating characteristics may include any characteristic which divides communications in a manner which is cancelable by a UE. For example, macro sets can be formed based on the sectors, designated groups of antennas, or the like. Sectors corresponding to a macro node may be partitioned into macro-sets which is described below with respect to FIG. 6. A quasi-ABS may include data from one or more of the macro sets and may place one or more special restrictions on the data being transmitted. For example, data may be restricted by the rank or priority of the transmission (e.g., rank 1 only), the transmission mode (e.g., TM3 only or TM3/4 only), the traffic to pilot ratio (e.g., TPR of 0 dB only), the modulation and coding scheme of the transmission (e.g., 64 QAM transmissions prohibited), etc.

Figure 6:
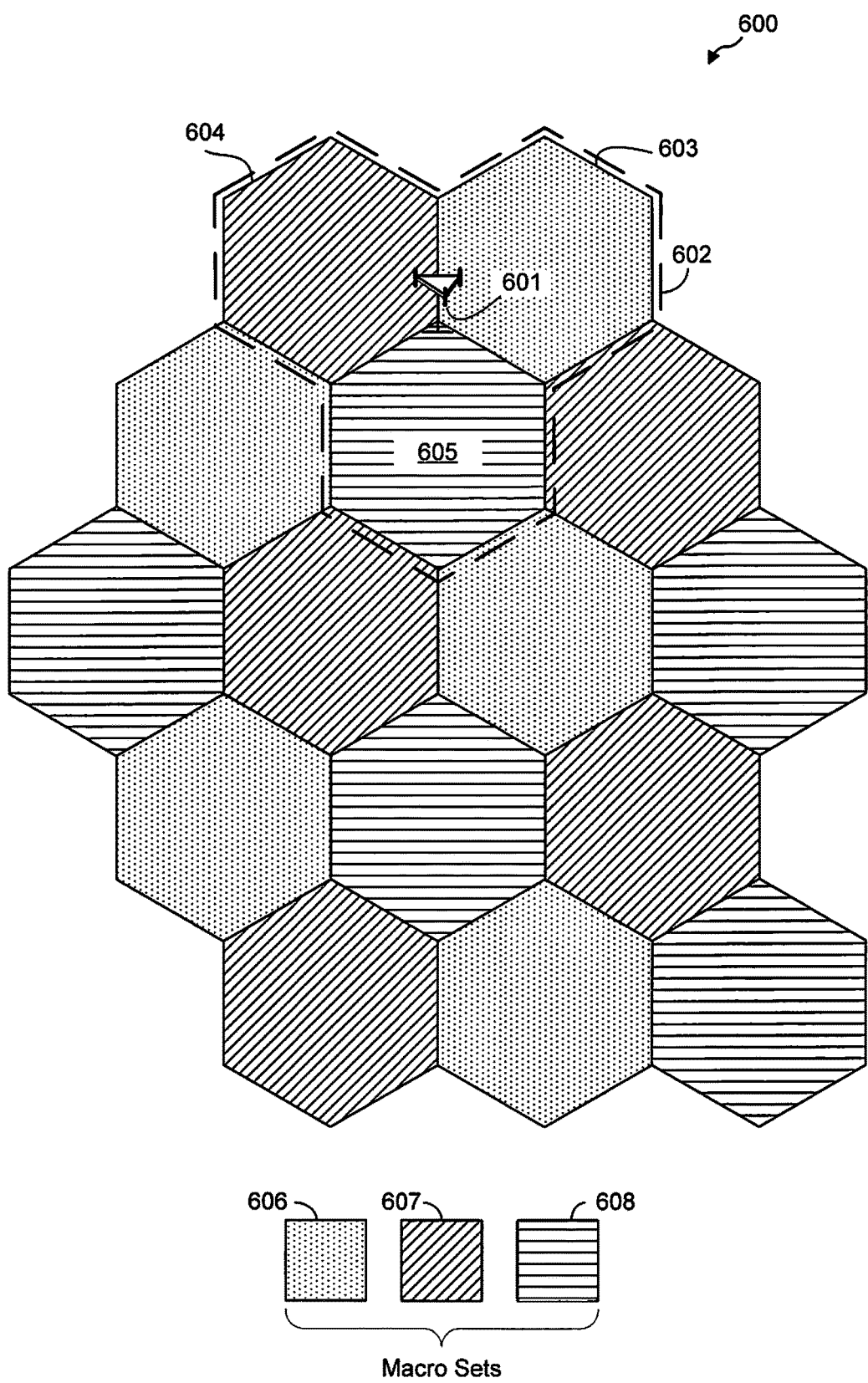
FIG. 6 is a block diagram conceptually illustrating an example layout of macro sets for a hexagonal deployment according to one aspect of the present disclosure.

FIG. 6 is a block diagram 600 conceptually illustrating an example layout of macro sets 606-608 for a hexagonal deployment according to one aspect of the present disclosure In this example, a coverage area 602 of a macro node 601 is divided into hexagonal sectors, e.g., sectors 603-605. Sectors 603-605 are represented with shading of different hatching patterns. Each hatching pattern represents a different macro set, macro sets 606-608. Each sector having the same hatching pattern belongs to the same macro set. Accordingly, the illustrated example includes three macro sets 606-608 corresponding to the three different hatching patterns of sectors 603-605. It is noted, however, that three macro sets, macro sets 606-608, are being utilized for the sake of example, and in some aspects a greater or fewer number of macro sets could be used. It is appreciated that the number of sets utilized may be a function of the capabilities of one or more of a macro node, pico node, and/or range expansion UEs.

Figure 7:
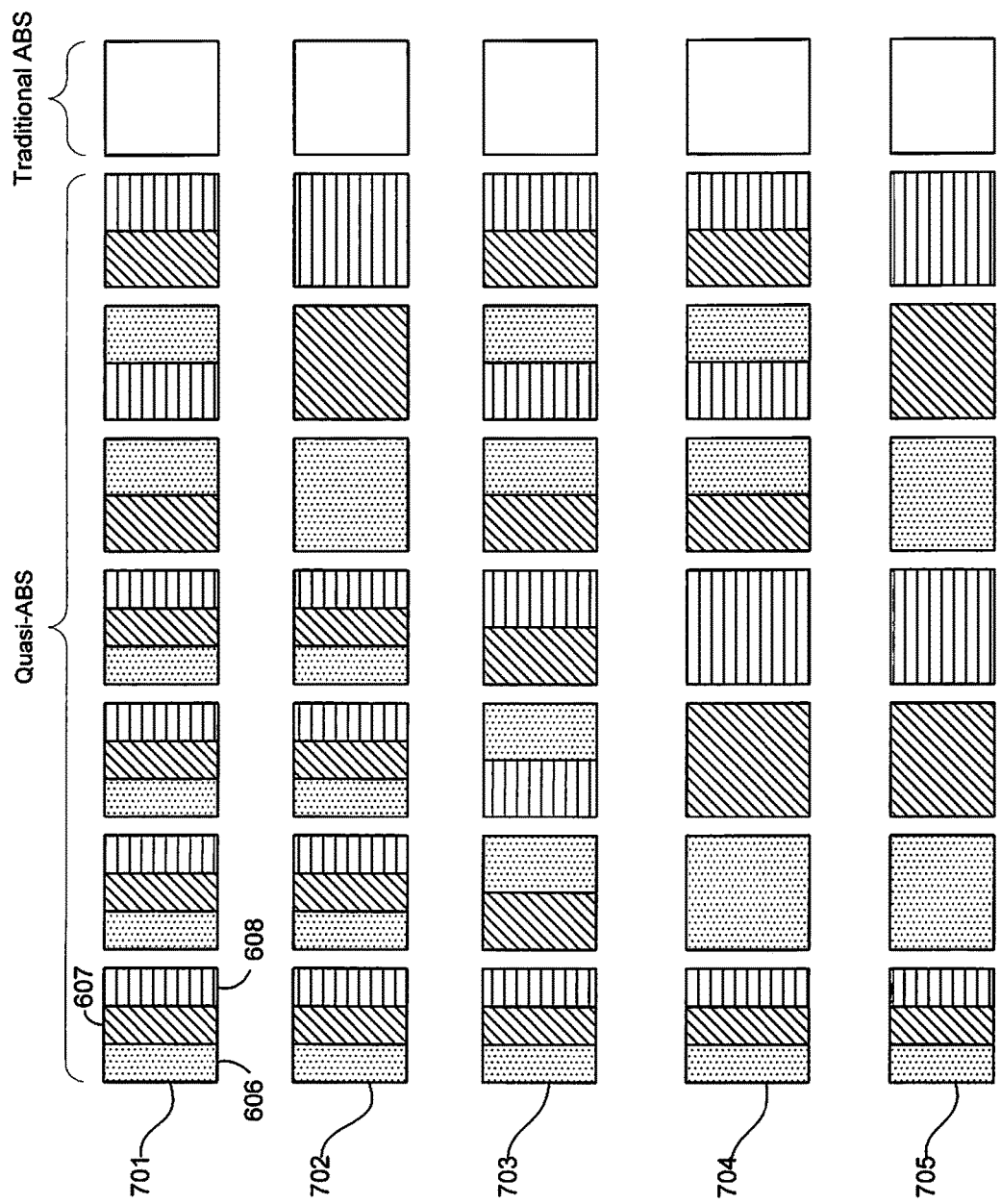
FIG. 7 is a block diagram conceptually illustrating an example layout of subframe assignment configurations for the macro sets of FIG. 6 according to one aspect of the present disclosure.

FIG. 7 is a block diagram 700 conceptually illustrating an example layout of subframe assignment configurations for macro sets 606-608 of FIG. 6 according to one aspect of the present disclosure. In row 701, eight subframes are shown in which seven out of eight subframes are quasi-ABS and the last subframe is a traditional ABS. In row 701, the first four out of eight subframes include each of macro sets 606-608 being active (e.g., ones which would normally be non-ABS in the above-described example). The next three subframes of row 701 have only two of macro sets 606-608 active. Additionally, in the final subframe of row 701 all macro sets are silent.

Accordingly, for row 701, a UE serviced by a macro node may utilize the first seven subframes and in which the macro node may selectively schedule transmissions for particular macro sets in the fifth through seventh subframes. Additionally, a range expansion UE that is IC capable may utilize all subframes of row 701. The UE can utilize IC methods to cancel interference from any of the macro sets which are broadcast. Such an arrangement provides for improved throughput because the macro node may utilize more of its resources for macro-serviced UEs, while range expansion UEs on a pico node are still able to utilize subframes which would have otherwise been dedicated only to the pico cell center UEs.

Row 702 of block diagram 700 illustrates an alternative configuration. In this example, the first four subframes have all macro sets 606-608 being active, similar to row 701. Additionally, the next three subframes of row 702 are illustrated in this example as utilizing only one of macro sets 606-608. The use of only one of macro sets 606-608 in these subframes may be advantageous for multiple reasons, e.g., in circumstances where a range expansion UE has limited IC capability which it may utilize to cancel the signals from the active one of macro sets 606-608.

Rows 703-705 show further configurations which illustrate additional exemplary resource partitioning schemes that may be used. It is recognized that the partitioning of resources may be dependent or based at least in part on a particular use, capabilities of the various nodes, UEs, etc. Further, embodiments may utilize a combination subframes which include: quasi-ABS and non-ABS; and quasi-ABS, non-ABS and traditional ABS. Accordingly, aspects are not necessarily limited to the specific configuration of these subframes.

It is noted that the number of interferers that can be reliably canceled is typically small, as increasing the number of interferers generally degrades the quality of cancellation of each interferer. Moreover, implementation complexity and power consumption may dictate that a UE can usually cancel no more than a fixed number of interferers. In such a typical scenario, it may be preferred to schedule a pico range expansion UE for subframes on which it can reliably cancel a subset of dominant interferers, while the remaining dominant interferers that it may not be able to cancel are silent. This is made possible by restricting the number of macro sets that are active on a given subframe. The configuration that is selected by the network may, in some aspects, be influenced primarily by two factors: (a) the number of interferers that a UE can cancel (such as, a UE specific capability that does not depend on the network); and (b) the number of dominant macro interferers seen by pico range expansion UEs (such as, a number that depends on the location of the UE in the network). Using FIG. 6 as an example, the macro sets may be considered, for purposes of this example, to be partitioned into different hatching patterns. Consider a pico cell range expansion UE with one interferer cancellation ability that sees three dominant interferers, and each interferer belongs to a macro set of a different hatching pattern. This UE is then scheduled on a subframe on which no more than one macro set is active. Consider another UE which sees three interferers, two of which are a first hatching pattern and the other one is a second hatching pattern, and is capable of canceling one interferer. This UE can be scheduled on any subframe on which the first hatching pattern macro set is inactive. Consider a third UE which sees three interferers, again two of which are the first hatching pattern and one is the second hatching pattern, but the UE has an ability to cancel two interferers. This UE can be scheduled on any subframe does not have both the first and second hatching pattern macro sets active. The network, based on the knowledge of UE cancellation ability and the number of interferers seen by UEs in the network, may pick a configuration and then schedule UEs (macro UEs, pico UEs within the normal coverage area, pico range expansion UEs) in the appropriate subframes.

In one aspect, it is the number of macro sets used by a macro node and how they are transmitted may be predetermined. In another aspect, the macro node may determine the number of macro sets and determine which sets will be broadcast on which subframe. This determination may be made in light of information obtained regarding one or more of a pico node, UE, etc. For example, in the event that a UE has limited IC capabilities, a macro node may receive this information and determine to utilize less macro sets in one or more subframes in order to allow a range expansion UE to cancel interference from the macro node. Conversely, if a UE has greater IC capabilities, more macro sets may be utilized in a subframe while maintaining the UE's ability to compensate for these signals.

It is noted that in one aspect the sectors of a macro node may be partitioned with the assistance of a UE. For example, a UE may provide information to a macro node (either directly or via a pico node) regarding which interferers are dominant and how many interferers that UE can cancel. Wide-band reference signal power (WRSRP) measurements of macro sectors from a range expansion UE may also be utilized.

In one aspect, the network may then partition the macro sectors into K sets (e.g. K=3 in the example above), such that for one or more range expansion UEs the dominant K interferers belong to different sets. It is noted that in some example implementations the number of macro sets and the chosen configuration created may change in a semi-static fashion depending one or more factors such as the distribution of UEs, the number of interferers that can be cancelled, and the like.

Further, performance and complexity issues may limit the number of dominant interferers that can be cancelled by a UE in some aspects. Range expansion UEs may be scheduled on subframes on which its dominant interferers are either silent or are active and can be cancelled by the UE. Because the macro set configuration may change on a semi-static basis, in some example aspects, after a configuration change a UE may indicate to the eNB its preferred subframes in the new macro set configuration. This indication may be accomplished through legacy communication channels or may be through specially configured reports (e.g., channel quality indicator reports). The eNB may also use the WRSRP measurements to determine the preferred subframes of a UE.

Accordingly, aspects of the present disclosure provide many advantages for increasing throughput in a heterogeneous network that uses range expansion elements. The use of quasi-ABSs having macro sets and partitioning those subframes as discussed above provides for better, more granular use of a macro node's resources. Further, scheduling a range expansion UE on a resource/subframe while considering one or more of: the active macro sets on a particular subframe and the number of interferers that a UE can cancel, allows the range expansion UE to utilize a pico node without requiring a complete partition of resources from a macro node.

In view of exemplary systems shown and described herein, methodologies that may be implemented in accordance with the disclosed subject matter, will be better appreciated with reference to various functional block diagrams. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 8:
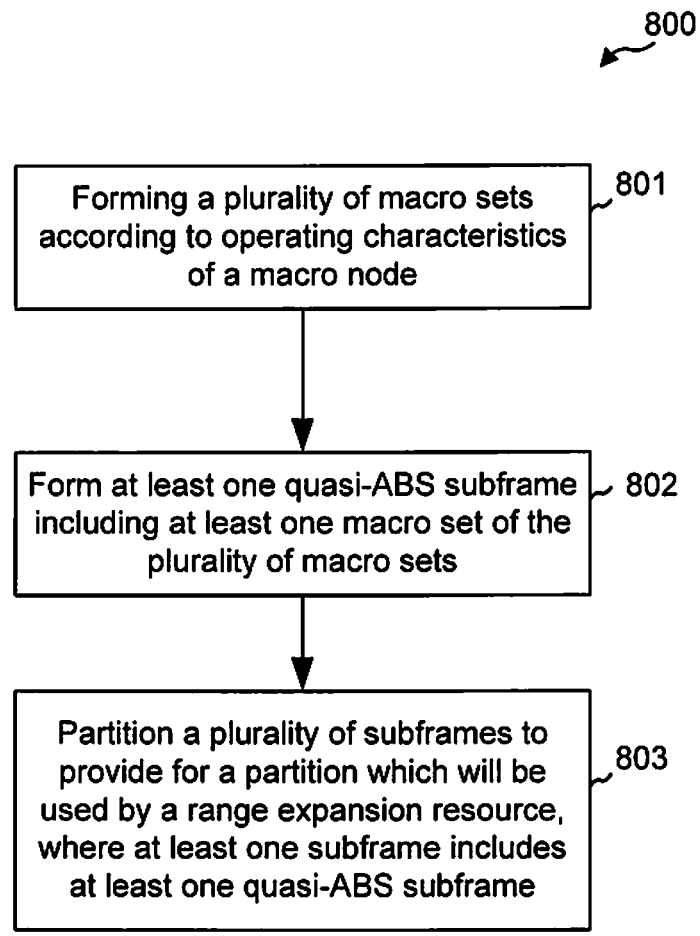
FIG. 8 is a functional block diagram illustrating example blocks executed to implement one aspect of the present disclosure.

In accordance with one or more aspects of the aspects described herein, with reference to FIG. 8 there is shown a methodology 800 operable by a network device for facilitating wireless communications. It is noted that in one aspect eNB 110 may be utilized to implement method 800. Specifically, processing blocks within method 800 may be implemented by one or more of the various processing resources of eNB 110, such as transmit processor 520, controller/processor 540, receive processor 538 and scheduler 544. Further, embodiments may utilize multiple eNBs 110 in communication with each other, such as a macro eNB and a pico eNB.

Method 800 may involve, at 801, forming a plurality of macro sets according to operating characteristics of a macro node. Additionally, method 800 may include, at 802, forming at least one quasi-ABS including at least one macro set of the plurality of macro sets. It is noted that the number of sectors and/or macro sets formed may vary based on the application and distribution of resources in the wireless network. Likewise, the number of macro sets included in a quasi-ABS may vary based on application. For example, in the event that a resource expansion UE has greater capabilities to implement IC, a larger number of macro sets may be included in a single subframe.

Further, method 800 may include, at 803, partitioning a plurality of subframes to provide for a partition which will be used by a range expansion resource, which include various types of network entities such as pico nodes, user entities, and the like, where at least one subframe of the partitioned plurality of subframes includes at least one of the formed quasi-ABSs. In some aspects, the partition for the range expansion resource may include both ABS and quasi-ABSs. The amount of frames partitioned for the range expansion resource may also vary according to the desired implementation. Considerations regarding the amount of resources needed between a pico node and macro node may influence such determinations.

In accordance with further aspects, method 800 may include additional processing blocks, such as in the event that operating characteristics include sectorization of the macro node, method 800 may designate a plurality of sectors corresponding to the macro node, wherein the plurality of macro sets are formed corresponding to the designated plurality of sectors. Further, method 800 may schedule, by a pico node, a transmission to a user entity within a quasi-ABS. Additional aspects may also include receiving data corresponding to a property of a range expansion UE (such as IC capabilities, information regarding observed signals, etc.) and determining which macro sets will be active in a quasi-ABS based at least in part on the received data.

In accordance with one or more aspects of the aspects described herein, with reference to FIG. 9 there is shown a methodology 900 operable by a user entity for facilitating wireless communications. It is noted that in one aspect, UE 120 may be utilized to implement method 900. Specifically, processing blocks within method 900 may be implemented by one or more of the various processing resources of UE 120, such as transmit processor 564 and controller processor 580, receive processor 558.

Method 900 may involve, at 901, providing, by a user entity, interference information to a macro node. As described above, such information may include information regarding IC capabilities of UE 120, information regarding interfering signals observed by UE 120, etc. Method 900 may further involve, at 902, receiving a communication scheduled by a pico node, where the communication is conveyed on a quasi-ABS which contains information corresponding to at least one macro set of data from a macro node.

According to a further aspect, a macro set may include a restricted transmission of data such as to include, e.g., data having a preselected priority, data having a pre-selected a transmission mode, data having a minimum traffic to pilot ratio, data having a specified a modulation and coding property, and the like. Method 900 may further involve cancelling interference corresponding to information which is included in the at least one macro set.

In accordance with one or more aspects of the aspects described herein, with reference to FIG. 10 there is shown a methodology 1000 operable by a network device, such as a pico node, for facilitating wireless communications. It is noted that in one aspect eNB 110 may be utilized to implement method 1000. Specifically, processing blocks within method 1000 may be implemented by one or more of the various processing resources of eNB 110, such as transmit processor 520, controller processor 540, receive processor 538 and scheduler 544. Further, embodiments may utilize multiple eNBs 110 in communication with each other, such as a macro eNB and a pico eNB.

Method 1000 may further involve, at 1001, receiving access to a plurality of subframes from a macro node, where at least one of the plurality of subframes includes a quasi-ABS having information corresponding to at least one macro set of data from a macro node.

Additionally, method 1000 may involve, at 1002, scheduling the at least one quasi-ABS to be used by a range expansion user entities. In further aspects, scheduling a quasi-ABS may include scheduling at least one user entity to utilize a quasi-ABS having a first set of macro sets of data from a macro node, and scheduling a different user entity to utilize a quasi-ABS having a second set of macro sets of data from a macro node.

According to a further aspect, method 1000 may also include providing interference information to a macro node such as information regarding cancellation capabilities of one or more range expansion UEs, information regarding interfering signals, and the like. Moreover, further aspects may include receiving an updated plurality of subframes from a macro node, and updating scheduling procedures in response to changes in the received plurality of subframes.

Another aspect of the present application may be described as an apparatus configured for wireless communication. The apparatus may include a means for designating a plurality of sectors corresponding to macro node, a means for forming a plurality of macro sets corresponding to the designated plurality of sectors, a means for forming at least one quasi-ABS including at least one macro set of the plurality of macro sets, and a means for partitioning a plurality of subframes to provide for a partition which will be used by a range expansion resource, where at least one subframe of the partitioned plurality of subframes includes at least one of the formed quasi-ABSs. In further aspects the apparatus may include a means for designating a plurality of sectors corresponding to the macro node, wherein the plurality of macro sets are formed corresponding to the designated plurality of sectors, one or more of a means for scheduling a transmission to a range expansion user entity within a quasi-ABS, a means for receiving data corresponding to a property of a range expansion UE, and a means for determining which macro sets will be active in a quasi-ABS based at least in part on the received data.

Such an apparatus may be implemented by a node, such as eNB 110 using various processing resources such as transmit processor 520, controller processor 540, receive processor 538 and scheduler 544. Further, embodiments may utilize multiple eNBs 110 in communication with each other, such as a macro eNB and a pico eNB.

Another aspect of the present application may be described as an apparatus configured for wireless communication. Such an apparatus may be implemented on a UE, such as UE 120, in communication with one or more eNBs 110. The apparatus may also utilize one or more of the various processing resources of UE 120, such as transmit processor 564 and controller processor 580, receive processor 558. The apparatus may include a means for providing, by a user entity, interference information to a macro node, and a means for receiving a communication scheduled by a pico node, where the communication is conveyed on a quasi-ABS which includes information corresponding to at least one macro set of data from a macro node. In a more detailed aspect, the apparatus may include a means for cancelling interference corresponding to information which is included in the at least one macro set.

Yet another aspect of the present application may be described as an apparatus configured for wireless communication. Such an apparatus may be implemented by a node, such as eNB 110 using various processing resources such as transmit processor 520, controller processor 540, receive processor 538 and scheduler 544. Further, embodiments may utilize multiple eNBs 110 in communication with each other, such as a macro eNB and a pico eNB. The apparatus may include a means for receiving access to a plurality of subframes from a macro node, such as pico eNB 110x, where at least one of the plurality of subframes includes a quasi-ABS which includes information corresponding to at least one macro set of data from a macro node. The apparatus may further include a means for scheduling, such as scheduler 544, the at least one quasi-ABS to be used by a range expansion user entity.

In a further aspect, the apparatus may include one or more of a means for providing interference information to a macro node (e.g. control processor 540/transmit processor 520). The scheduling means (e.g. scheduler 544) may also comprise a means for scheduling at least one user entity to utilize a quasi-ABS having a first set of macro sets of data from a macro node, and a means for scheduling a different user entity to utilize a quasi-ABS having a second set of macro sets of data from a macro node. Further aspects may also include a means for receiving, such as via receive processor 538, an updated plurality of subframes from a macro node and a means for updating scheduling procedures in response to changes in the received plurality of subframes.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in the FIGS. may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   providing, by a user entity, interference information to a macro node, wherein the interference information provided by the user entity includes information relating to interference cancellation capabilities of the user entity, and the interference cancellation capabilities include one or more of: a restriction type of transmission and a number of transmissions that the user entity is capable of canceling; and
   receiving a communication scheduled by a base station, wherein the communication is conveyed on a quasi-ABS which includes information corresponding to at least one macro set of data from the macro node, said macro set being made active on the quasi-ABS based at least in part on the interference information.

2. The method of claim 1 further comprising cancelling interference corresponding to information which is included in the at least one macro set.

3. A method of wireless communication, comprising:
providing, by a user entity, interference information to a macro node;
receiving a communication scheduled by a base station, wherein the communication is conveyed on a quasi-ABS which includes information corresponding to at least one macro set of data from the macro node; and
cancelling interference corresponding to information which is included in the at least one macro set,
wherein the at least one macro set includes a restricted data transmission from the macro node, and the data is restricted to include data having at least one of:
a pre-selected priority,
a pre-selected a transmission mode,
a minimum traffic to pilot ratio, or
a specified modulation and coding property.

4. The method of claim 3 wherein the data is restricted to include data having a pre-selected priority.

5. The method of claim 3 wherein the data is restricted to include data having a pre-selected transmission mode.

6. The method of claim 5 wherein the pre-selected transmission mode is one of a TM3 and TM3/4 mode.

7. The method of claim 3 wherein the data is restricted to include data having a minimum traffic to pilot ratio.

8. The method of claim 3 wherein the data is restricted to include data having a specified modulation and coding property.

9. The method of claim 1 wherein the interference information provided by the user entity includes information relating to interference signals observed by the user entity.

10. An apparatus configured for wireless communication, the apparatus comprising:
at least one processor; and
a memory coupled to the at least one processor,
wherein the at least one processor is configured:
to provide, by a user entity, interference information to a macro node, wherein the interference information provided by the user entity includes information relating to interference cancellation capabilities of the user entity, and the interference cancellation capabilities include one or more of: a restriction type of transmission and a number of transmissions that the user entity is capable of canceling; and
to receive a communication scheduled by a base station, wherein the communication is conveyed on a quasi-ABS which includes information corresponding to at least one macro set of data from the macro node, said macro set being made active on the quasi-ABS based at least in part on the interference information.

11. The apparatus of claim 10 wherein the processor is further configured to cancel interference corresponding to information which is included in the at least one macro set.

12. The apparatus of claim 11 wherein the at least one macro set includes a restricted data transmission from the macro node.

13. The apparatus of claim 10 wherein the interference information provided by the user entity includes information relating to interference signals observed by the user entity.

14. A method of wireless communication, comprising:
receiving access to a plurality of subframes from a macro node, wherein at least one of the plurality of subframes includes at least one quasi-ABS which includes information corresponding to at least one macro set of data from the macro node; and
scheduling the at least one quasi-ABS to be used by a range expansion user entity, wherein scheduling the at least one quasi-ABS, including:
scheduling at least one user entity to utilize a quasi-ABS having a first set of macro sets of data from the macro node, and
scheduling a different user entity to utilize a quasi-ABS having a second set of macro sets of data from the macro node.

15. The method of claim 14 further comprising providing interference information to the macro node.

16. The method of claim 15 wherein interference information includes information relating to interference cancellation capabilities of one or more range expansion user entities.

17. The method of claim 14 further comprising:
receiving an updated plurality of subframes from the macro node; and
updating scheduling procedures in response to changes in the received plurality of subframes.

18. An apparatus configured for wireless communication, the apparatus comprising:
at least one processor; and
a memory coupled to the at least one processor,
wherein the at least one processor is configured:
to receive access to a plurality of subframes from a macro node, wherein at least one of the plurality of subframes includes a quasi-ABS which includes information corresponding to at least one macro set of data from the macro node; and
to schedule the at least one quasi-ABS to be used by a range expansion user entity, including:
scheduling at least one user entity to utilize a quasi-ABS having a first set of macro sets of data from the macro node, and
scheduling a different user entity to utilize a quasi-ABS having a second set of macro sets of data from the macro node.

19. The apparatus of claim 18 wherein the processor is further configured to provide interference information to macro node.

20. The apparatus of claim 19 wherein interference information includes information relating to interference cancellation capabilities of one or more range expansion user entities.

21. The apparatus of claim 18 wherein the processor is further configured:
to receive an updated plurality of subframes from the macro node; and
to update scheduling procedures in response to changes in the received plurality of subframes.

* * * * *